//patentoffice 2,902,454

SOLVENT COMPOSITION FOR RECOVERY OF METAL VALUES FROM AQUEOUS SOLUTIONS BY SOLVENT EXTRACTION

Robert L. Moore, Richland, Wash., assignor to the United States of America as represented by the United States Atomic Energy Commission No Drawing. Application June 25, 1952
Serial No. 295,544

2 Claims. (Cl. 252—364)

The present invention relates to solvent extraction methods for recovery of heavy metal values from aqueous solutions and in particular relates to a special diluent for the organic solvent employed in solvent extraction of heavy metal values from aqueous solutions.

An object of this invention is to provide an improved solvent extraction method for the recovery of transuranic heavy metals from their aqueous solutions and from their aqueous solutions which also contain metal values of fission products and/or other metal values of lower atomic number which are commonly associated with transuranic heavy metal values.

A further object of this invention is to provide a method for preparing a solution which is free of heavy metal values and is so constituted as to be well adapted to further treatment for recovery of fission product metal values therefrom.

Still a further object of this invention is to provide a solvent extraction method for the recovery of heavy metal values from aqueous solution wherein the extraction coefficients for said metal values are markedly superior to those obtained by similar solvent extraction methods employed for the same purpose.

Other objects and advantages of the instant invention will be evident from the following description.

Heavy metal values such as thorium, protactinium, uranium, neptunium, and plutonium have been recovered heretofore from their aqueous solutions and separated from metal values of lower atomic weights by solvent extraction using an organic solvent of the alkyl phosphate type. Some alkyl phosphate solvents, such as the preferred tributyl phosphate, are not well suited to column operations on account of their high density and viscosity which physical properties account for the poor separation of phases encountered.

It is therefore necessary to add a diluent for the solvent to improve the separation of phases, but such dilution usually serves to improve the physical properties only at the expense of the efficiency of extraction which decreases on account of the dilution.

I have now discovered that non-aromatic, substantially water-immiscible and normally liquid, halogenated hydrocarbons constitute especially effective diluents for the alkyl phosphate solvent extractants. Chlorinated, fluorinated or brominated hydrocarbons are suitable. Chlorinated hydrocarbons, such as chloroform, trichloroethylene, ethylenedichloride, orthodichlorobenzene, and mixed halogen substituted hydrocarbons, such as the chlorine-fluorine-substituted compounds known commercially under the trade-name "Freon" have been found satisfactory. For instance, "Freon 112" ($C_2Cl_4F_2$), "Freon 113" ($C_2Cl_3F_3$), "Freon 114" ($CClF_2$—$CClF_2$), "Freon 115" ($CClF_2$—$CF_3$) and "Freon 316 ($C_4Cl_2F_6$) have given excellent results. The preferred diluent, though, from among the substituted hydrocarbons containing mixed halogens is "Freon 113," while the preferred organic solvent diluent from among the hydrocarbons containing a single type of halogen substitution is carbon tetrachloride. Any aromatic constituent if present in either the solvent or the diluent has been observed to decrease the separation of various metal values by extraction. Therefore diluents, such as carbon tetrachloride, which usually are completely free of aromatic ingredients, are particularly well suited for the process of the invention.

In accordance with the present invention the aforementioned heavy metal values of the actinide series are separated from aqueous media by extraction with a substantially water-immiscible mixture of an alkyl phosphate and a normally liquid halogenated hydrocarbon as hereinbefore disclosed. The halogenated hydrocarbon diluents, apart from being water-immiscible, should be miscible with the alkyl phosphate, relatively stable to acid, relatively nonvolatile at normal operating temperatures, have a high flash point, and also should be less viscous than the alkyl phosphate. Moreover, the preferred halogenated hydrocarbons are those that yield a mixture with the alkyl phosphate of a density markedly lower or markedly higher than the aqueous solution to be treated.

The alkyl phosphate compounds which are suitable agents for the solvent extraction of the heavy metals from their aqueous solutions are those compounds included within the scope of the general formula:

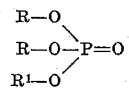

wherein R is either hydrogen or an alkyl radical and $R^1$ is an alkyl group; the total number of carbon atoms in the molecule is preferably at least 12 in order to insure adequate immiscibility with water. The preferred alkyl phosphate is tributyl phosphate; however, trioctyl phosphate, trihexyl phosphate, dioctyl hydrogen phosphate, octadecyl dihydrogen phosphate, dioctylphenyl phosphonate, didecylphenyl phosphonate, dihexylphenyl phosphonate, and mixtures thereof are also suitable. These solvent extractants are useful in recovery of all heavy metals and especially those heavy metals kown as the actinides.

A mixture of alkyl phosphate and diluent is preferably used which contains from 10 to 25% by volume of alkyl phosphate. In the case that the heavy metals are to be extracted in order to separate them from other non-extractable values, the separation improves with increasing heavy metal content of the alkyl phosphate. Therefore, solvent mixtures which are "lean" with respect to the alkyl phosphate are preferable for such separation processes.

The aqueous solutions of heavy metal values to be treated in accordance with the present invention should contain ions of these heavy metals in at least the tetravalent state. The concentrations may vary from tracer amounts to saturation. The heavy metal values to be extracted from aqueous solution are preferably present in their hexavalent state, e.g. as the plutonyl and uranyl salts which are recoverable from substantially acid-free aqueous solutions. Ordinarily the solutions to be extracted with an organic solvent are preferably sulfate-free, phosphate-free and oxalate-free, since these ions are strong complexing agents for the heavy metal values and thus interfere to a large extent with their extraction by an organic solvent.

In the case of solutions containing tetravalent heavy metal ions it is desirable to maintain free acid in the aqueous solution. Although acid concentrations between 3 and 3.5 molar are adequate in most cases for extraction of heavy metal values, the acidity of the aqueous solution can be as high as 7 molar; the total acid anion concentration is preferably maintained at this higher level in order to inhibit complexing of the heavy metal values by any sulfate or phosphate ions. By maintaining relatively high acid concentrations in the aqueous solution, i.e., free acid concentrations of about 4 to 5 N mineral acid such as nitric and hydrochloric acid, such complexing of tetravalent heavy metals is kept to a minimum. Pentavalent protactinium metal values and tetravalent thorium values can be extracted from solutions which are 3 to 3.5 molar in mineral acid. Extraction of heavy metals from aqueous solutions by the diluent-tributyl phosphate mixture is substantially greater with decreasing concentrations of heavy metal values.

In accordance with the present invention, as in most solvent extraction processes, a "salting-out" agent is employed to promote distribution of the heavy metal value in the organic solvent phase. These salting-out agents for the heavy metal values are water-soluble, substantially insoluble in the organic solvent and preferably have an anion in common with the anion of the metal salt to be extracted. For example, when nitric acid had been used as a solubilizing agent for the heavy metal values to be recovered, the "salting-out" agent is preferably an inorganic nitrate, such as aluminum nitrate or sodium nitrate.

In the process of this invention the concentration of "salting-out" agent will depend on the content of free acid, which also acts as a salting-out agent. A total nitrate or other acid anion concentration between 3 and 12 M, preferably between 5 and 10 M, has been used satisfactorily, the higher concentrations yielding the better results.

In effecting extraction of the heavy metal values from aqueous media according to the process of this invention, the volume ratio between the aqueous solution and the alkyl phosphate-diluent mixture may vary over a wide range and is suitably between 10:1 and 1:10. The time necessary for contact and phase separation depends upon the extractant mixture employed; a period of time between 25 and 45 seconds was mostly sufficient for phase separation.

The organic solvent phase may be either the dispersed or the continuous phase, but it is preferably the dispersed.

Upon extraction of heavy metal values into the organic solvent phase and separation thereof from the aqueous raffinate, the heavy metal values are suitably back-extracted by contacting the organic extract phase with an aqueous solution, and preferably a solution which contains a water-soluble fluoride, sulfate, phosphate, oxalate, tartrate or carbonate which either complex or precipitate at least part of the heavy metals back-extracted therewith depending on the particular ions involved. The extraction with alkyl phosphates is slightly affected by temperature changes within 10° to 50° C., the lower temperatures yielding the better extraction values. This fact may be utilized in the back-extraction step which is advantageously carried out at elevated temperatures, the degree of temperature increase being determined by the volatility of the extractant mixture. The process of this invention is very well suitable for the separation of heavy metal values from lighter-weight metal values contained together in aqueous solutions. Aqueous solutions of the foregoing type, for instance, are obtained in the processing of neutron-irradiated uranium or of ore materials. In order to recover and separate from each other the various metals contained in such solutions, the total anion concentration is adjusted to between 3 and 12 normal of a "salting-out" agent in the form of free acid, a water-soluble salt or both, as has been described above. The solution is then contacted, preferably at room temperature, with the alkyl phosphate-halogenated hydrocarbon mixture of this invention.

As has been preivously mentioned, for decontamination of heavy metal values from lighter metal values, e.g. fission product elements, it is desirable that the process be carried out under conditions wherein the solvent extractant closely approaches saturation by the heavy metal values thereby keeping simultaneous extraction of fission product values to a minimum.

The following examples serve as illustration for the principal embodiments of this invention. However, these are to be construed as merely illustrative rather than limiting the scope of the instant invention.

*Example I*

Several samples of an aqueous solution 0.2 M in uranyl nitrate hexahydrate and 5 M in nitric acid were contacted each with an equal volume of various solvent mixtures, each containing 20% by volume of tributyl phosphate and 80% of the diluents enumerated below.

| Solvent | Distribution ratio (organic/aqueous) |
| --- | --- |
| Kerosene | 9.32 |
| Iso-Octane | 8.45 |
| Methyl Cyclo Hexane | 10.4 |
| Benzene | 13.2 |
| Chloroform | 3.22 |
| Carbon Tetrachloride | 20.1 |
| Trichloroethylene | 6.8 |
| 1-dichlorofluoro-2-chlorodifluoroethane | ~20 |

The above-tabulated results show that the chlorinated hydrocarbons yield at least as good an extraction as do the plain hydrocarbons, but they are definitely superior to the hydrocarbons with regard to non-inflammability and stability to acid.

*Example II*

The following experiment demonstrates the superiority of carbon tetrachloride as a diluent for tributyl phosphate to hexane. 100 ml. of an aqueous solution containing 0.513 M uranyl nitrate hexahydrate, 0.44 M $H_3PO_4$, 0.44 M $H_2SO_4$, 0.164 M $HNO_3$ and 0.10 M $NaNO_3$ were acidified with 45 ml. concentrated $HNO_3$ whereby a nitric acid concentration of 5 M was obtained. This solution was then mixed with an equal volume of 5 M $HNO_3$ which represented the scrub solution of the usual column extraction.

Two aliquots of the solution each were contacted with an equal volume of a mixture of 20% by volume of tributyl phosphate and 80% of diluent. The average temperature was 28° C. In one instance the diluent was hexane and in the other one carbon tetrachloride. Successive extractions with the hevane-diluted tributyl phosphate left 19.5, 2.15, 0.29, and 0.028% of the uranium initially present in the aqueous solution, while the corresponding values obtained with the carbon tetrachloride-diluted tributyl phosphate were 10.4, 1.81, 0.209, and 0.01.

It will be understood that this invention is not to be limited to the details given herein but that it may be modified within the scope of the appended claims.

I claim:

1. An organic solvent mixture consisting of from 10 to 25% by volume tributyl phosphate and the remainder 1-dichlorofluoro-2-chlorodifluoroethane.

2. An organic solvent mixture consisting of from 10 to 25% by volume of tributyl phosphate and the remainder a chlorinefluorine-substituted saturated hydrocarbon having two carbon atoms in the molecule.

References Cited in the file of this patent

UNITED STATES PATENTS

| | | |
| --- | --- | --- |
| 833,573 | Becigneul | Oct. 16, 1906 |
| 943,986 | Murray et al. | Dec. 21, 1909 |
| 1,253,571 | Bonneau et al. | Jan. 15, 1918 |

OTHER REFERENCES

Warf: U.S. Atomic Energy Commission declassified document No. 2524, August 7, 1947, declassified March 11, 1949, 10 pages.